Jan. 5, 1926.  
N. FREEMAN  
IDENTIFICATION AND SALES TAG  
Filed April 24, 1923

CLOTHING CO.

THIS TICKET MUST ACCOMPANY GARMENT IF RETURNED FOR CREDIT OR ALTERATION

| REG. | 1947 |
|---|---|
| PRICE | DEPT. |
| BAL. | |

| SALES SLIP | 1947 |
|---|---|
| REG. | DEPT. |
| MN | COLOR |
| PRICE | SIZE |
| SOLD BY | AMT. REC. | BAL. |

| SALESLADY'S RECEIPT | |
|---|---|
| DATE | 1947 |
| PRICE | DEPT. |

| CUSTOMER'S RECEIPT | |
|---|---|
| PRICE | 1947 |
| BAL. | DEPT. |

Fig. 2.

NAME  
ADDRESS  
WHEN WANTED  
CALL    SEND

CLOTHING CO.

Inventor  
Norman Freeman  
By Harry Cohen  
Attorney

Patented Jan. 5, 1926.

UNITED STATES PATENT OFFICE.

NORMAN FREEMAN, OF CAMBRIDGE, MASSACHUSETTS.

IDENTIFICATION AND SALES TAG.

Application filed April 24, 1923. Serial No. 634,342.

*To all whom it may concern:*

Be it known that I, NORMAN FREEMAN, a citizen of the United States, residing at Cambridge, in the county of Middlesex and the Commonwealth of Massachusetts, have invented a new and useful Identification and Sales Tag, of which the following is a specification.

My invention relates to a combined identification and sales record tag.

It is customary for merchants to place an identification tag on each article placed on sale. When the article is sold, the salesperson usually copies the information contained on the identification tag to a sales slip which is usually in triplicate form. The original sales slip is sent to the accounting department or office, a copy of the slip is given to the buyer and the other copy is retained by the clerk. This system, besides being laborious and time consuming, very frequently results in errors, especially when the salesperson or clerk is busy and must therefore hurriedly make out the sales slip and hurriedly copy the data from the identification tag on the article sold. Also, when the sale is on credit, it is necessary for the accounting department to make a copy of the sales slip for the buyer's ledger record. It is obvious and it is the result of experience that errors in making out the sales slip or the ledger record cause difficulties and dissatisfaction.

The object of my invention is to obviate the disadvantages inherent in the old method, and I accomplish this object by the provision of a novel form of tag which also has advantages which will hereinafter appear.

For a complete understanding of my invention reference is to be had to the following description and the accompanying drawings in which:

Fig. 1 is a view of the front of the tag; and

Fig. 2 is a view of the rear of the tag.

Referring to the drawings in detail, there is shown a unitary tag made of manila paper, by preference, and comprising portions 10, 11, 12, and 13, separable at the transverse scored lines *a*, *b* and *c*.

The portion 10 constitutes the identification tag and is provided with an aperture through which a string or other means may pass whereby the tag may be attached to the particular article. As clearly shown by the drawings, this portion bears on its front face certain printed matter relating to the article, including the number of the article and certain captions indicating the character of the data to be supplied, including the sale price of the article.

The portion 11 constitutes the sales slip and is perforated at 14 to permit of the convenient filing of the slip after the sale is made and after it is separated from the other portions of the tag. This part 11 carries on its front face a duplication of the data appearing on the identification portion 10, and in addition has certain other captions and blank spaces for the entry of other desired information. On the reverse of the sales slip is a ledger form which is intended for a record of the buyer's account when a sale is made on credit.

The parts 12 and 13 constitute, respectively, the clerk's receipt and the buyer's receipt and carry on their front faces proper identification data, captions and entry blanks, as are clearly shown by the drawing. These parts are separated from each other when a sale is made, the salesperson giving the receipt 13 to the buyer and retaining the receipt 12.

From an inspection of the tag as represented by the drawings it is obvious that most of the entry blanks may be filled out by an office clerk or by the salesperson during leisure hours leaving but little for the salesperson to do at the time of the sale. When a sale is made the tag is separated at the scoring *a*, the identification tag 10 remaining on the article sold. Then the salesperson fills in the appropriate blanks with his identification number or letter and the amount of money received, and if a part payment is made, the balance due is noted in the space provided and a proper entry is made on the ledger form on the reverse side of the sales slip portion 11. In the event of a cash sale, the ticket including the sales slip 11 and the receipts 12 and 13 is handed to the cashier together with the money received and is stamped paid, the cashier separating and retaining the sales slip 11 and returning the receipts 12 and 13 to the salesperson who separates them and gives the receipt 13 to the buyer and retains the part 12 for record. Thus a complete record of the transaction is conveniently and quickly made and the possibility of the making of errors is reduced to a minimum. The salesperson is relieved of the duty of copying information from the identification tag at the time of the sale, and the accounting clerk is relieved of the duty of transferring data from the sales slip to the ledger.

From the above description, it is apparent that the invention comprises a combined identification and sales slip arranged in separable portions having duplicate data thereon and blanks and captions whereby the information concerning the sale may be quickly and accurately recorded so that a proper history of the transaction may be had without the time and labor consumption inherent in the old method and without the likelihood of resulting errors.

While I have shown and described the preferred embodiment of the invention, it will be obvious, in view of my disclosure, that certain changes in the form and characteristics of the tag will suggest themselves and may be made to suit the requirements of certain conditions that might arise, but all such changes are considered as part of my invention as defined by the following claims.

Having thus described my invention, what I claim and desire to secure by Letters Patent of the United States is:

1. A combined identification tag and sales slip comprising a portion constituting an identification tag for attachment to an article on sale and bearing on its face certain information respecting said article, and a portion detachably secured to said first mentioned portion and to be removed therefrom at the time of the sale to constitute a sales slip and bearing duplicate information concerning the article and captions indicating the character of information to be entered thereon when the article is sold, said sales slip having a ledger form on its reverse side for use as a record of the buyer's account when the sale is made on credit.

2. A combined identification tag and sales slip as defined by claim 1 having a receipt portion detachably connected to the sales slip.

In testimony whereof I affix my signature.

NORMAN FREEMAN.